US005529161A

United States Patent [19]
Ament et al.

[11] Patent Number: 5,529,161
[45] Date of Patent: Jun. 25, 1996

[54] FRICTION CLUTCH FOR A TRANSMISSION OF A MOTOR VEHICLE AND A TORSIONAL DAMPER FOR A FRICTION CLUTCH

[75] Inventors: Norbert Ament, Eltingshausen; Harald Raab, Schweinfurt, both of Germany

[73] Assignee: Fichtel & Sachs AG, Schweinfurt, Germany

[21] Appl. No.: 344,749

[22] Filed: Nov. 23, 1994

[30] Foreign Application Priority Data

Nov. 26, 1993 [DE] Germany .......................... 43 40 282.8

[51] Int. Cl.⁶ ...................................................... F16D 3/14
[52] U.S. Cl. .................. 192/213.31; 192/70.17; 464/66; 464/68; 74/574
[58] Field of Search ....................... 192/213.31, 213.12, 192/213.22, 214.1, 70.17; 74/574; 464/64, 66, 68

[56] References Cited

U.S. PATENT DOCUMENTS

| 4,274,525 | 6/1981 | Raab et al. ...................... 192/213.31 |
| 4,496,036 | 1/1985 | Loizeau ............................. 192/213.31 |
| 4,526,261 | 7/1985 | Maier et al. ..................... 192/70.17 X |
| 4,548,310 | 10/1985 | Maucher .......................... 192/70.17 X |
| 5,000,304 | 3/1991 | Köck et al. ...................... 192/70.17 X |
| 5,163,875 | 11/1992 | Takeuchi ........................ 192/213.31 X |
| 5,238,096 | 8/1993 | Ament et al. ......................... 464/68 X |
| 5,431,269 | 7/1995 | Ament et al. ......................... 464/68 X |

FOREIGN PATENT DOCUMENTS

| 0916016 | 8/1954 | Germany . |
| 2242253 | 9/1991 | United Kingdom . |

*Primary Examiner*—Andrea L. Pitts
*Attorney, Agent, or Firm*—Nils H. Ljungman and Associates

[57] ABSTRACT

A friction clutch can typically have a rotary power input member which can be rotationally engaged by means of a torsional damping device such as springs located between the input and output members. The output member can include a hub, non-rotationally connected to a hub disc, and the input member can include at least one disc-shaped member disposed adjacent the hub disc, which disc-shaped member can have friction linings for engaging a rotating part of an engine. The torsional damping device can include a base friction apparatus and a load friction apparatus for which friction rings are used, which rings have an internal axial stress and generate the frictional force as a result of their material properties and their axial friction mounting.

20 Claims, 10 Drawing Sheets

III - III

II - II

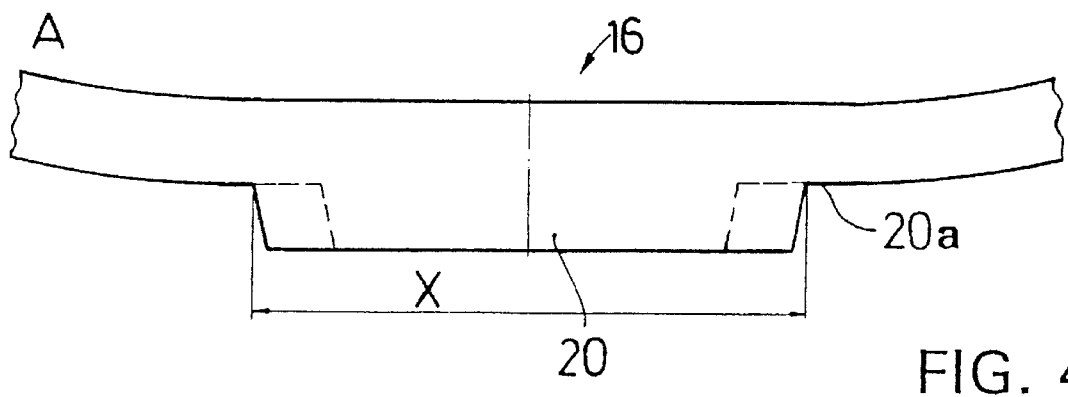
FIG. 4
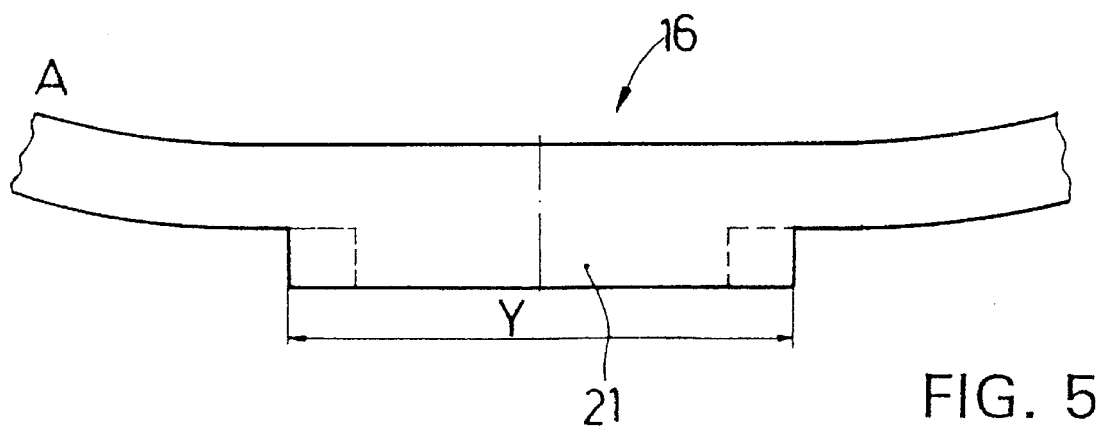
FIG. 5
FIG. 6a
FIG. 6b
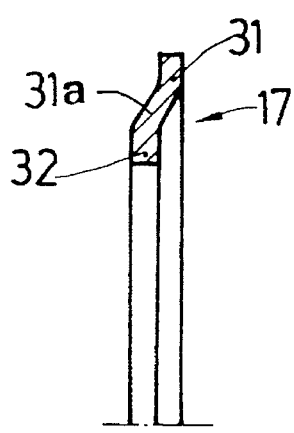
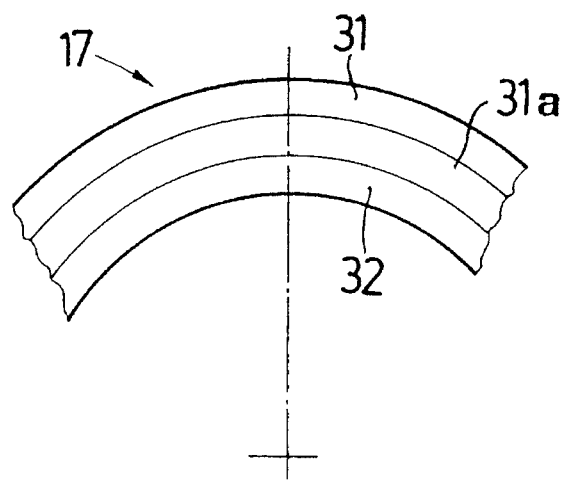

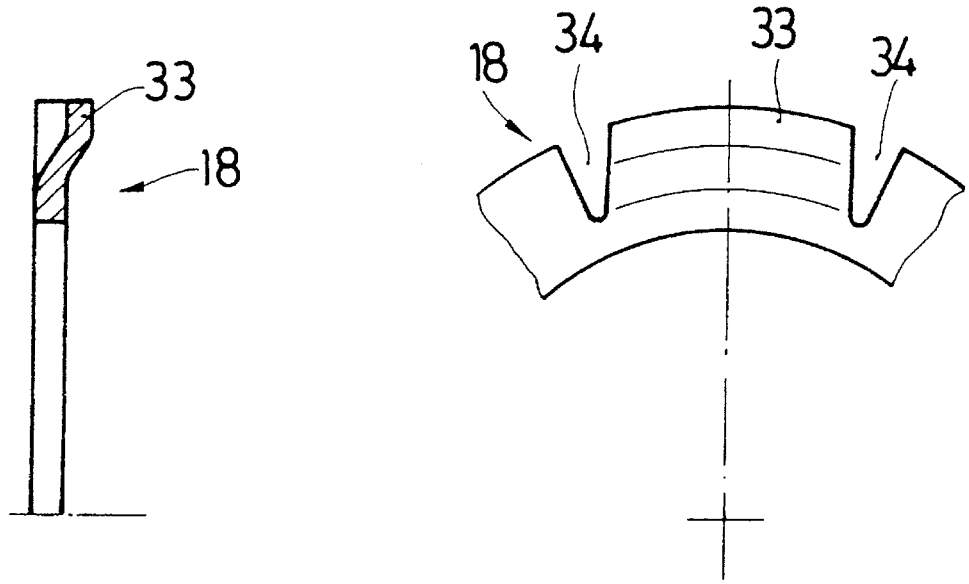
FIG. 7a          FIG. 7b
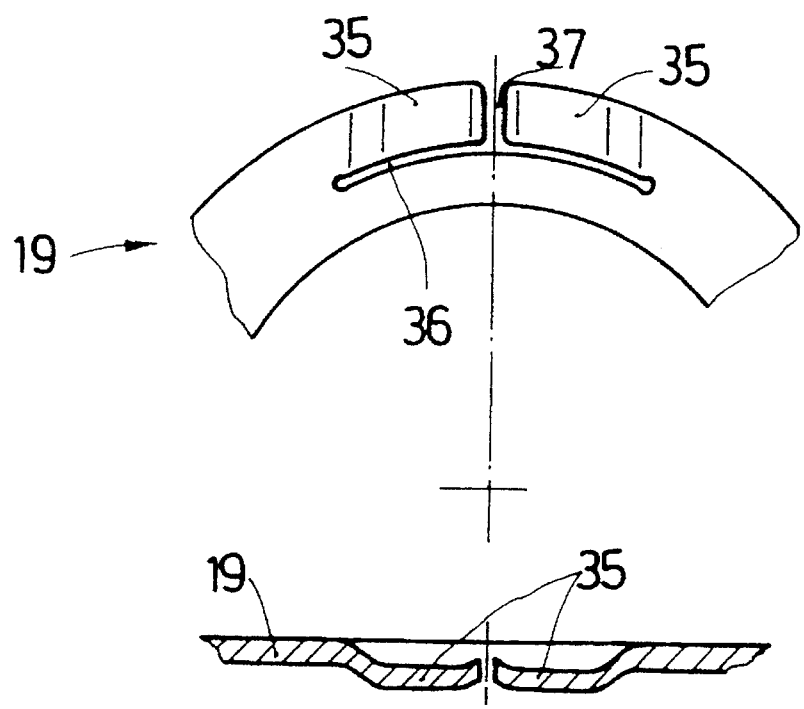
FIG. 8a
FIG. 8b

FRICTION CLUTCH FOR A TRANSMISSION OF A MOTOR VEHICLE AND A TORSIONAL DAMPER FOR A FRICTION CLUTCH

BACKGROUND OF THE INVENTION

1. Field of the Invention

The present invention relates to friction clutch for a transmission of a motor vehicle and also to a clutch plate for a friction clutch. More specifically, the present invention relates to a torsional vibration damper in a clutch plate in the drive train of a motor vehicle. Such a torsional vibration damper in the drive train of a motor vehicle can typically have a disc-shaped input part with friction linings that can be arranged concentric to an axis of rotation, and a disc-shaped output part, which can likewise be oriented concentric to the axis of rotation.

The disc-shaped output part can also have a hub so that the output part can be non-rotationally mounted on a gear shaft. Such a torsional vibration damper can also have springs disposed in apertures of the input part and the output part, for the transmission of torque from one part to the other, against the force of the spring as the two parts rotate relative to one another. In addition, a friction ring arrangement can be disposed between axially opposite surfaces of the input part and the output part. This friction ring arrangement can have a friction ring to which an axial force is applied, which friction ring can be installed concentric to the axis of rotation.

2. Background Information

German Patent Specification 916 016, for example, discloses one known type of torsional vibration damper in a clutch plate which is similar to the design mentioned above. For the damping of torsional vibrations on this known clutch plate, there are both torsion springs in the form of coil springs and a system of friction rings between axially opposite surfaces of the input part and the output part, to which surfaces an axial force is applied. The friction effect is produced by means of either axially zig-zag and installed metal spring elements or a system of friction rings consisting of such spring elements together with loosely inserted friction rings.

On the one hand, a metal-on-metal frictional force is generated in this case, which causes problems of coordinating the achievable frictional force with the level of the frictional force and the evenness of the frictional force. On the other hand, separate rings manufactured from different materials and thus having different coefficients of friction are inserted loosely into the system, whereby no specific friction surface is defined. The friction surface can easily change during operation, whereby uncontrolled fluctuations in the generation of frictional force cannot be avoided.

OBJECT OF THE INVENTION

It is therefore the object of the present invention to overcome the disadvantages of the known torsional vibration dampers at a reasonable cost.

SUMMARY OF THE INVENTION

The present invention teaches that this object can be achieved by means of a friction ring, preferably made of plastic, and which friction ring preferably has integral, partial, essentially axially oriented indentations so that the friction ring can preferably be installed with an internal axial stress for the generation of axial force.

By means of such a design, it can be possible to create a very simple and economical friction ring arrangement. This design also essentially guarantees that the frictional force which can be generated can preferably be varied over essentially a wide range by the selection of the plastic and the internal axial stress. Thus, it can essentially be easy to match the frictional force to the actual operating conditions. The use of a plastic material opposite two metal parts can essentially guarantee that a change in the friction surfaces does not result in a change in the frictional force.

The partial indentations of the friction ring, in accordance with the present invention, can essentially have a variety of shapes. In a particularly simple design, for example, the indentations can preferably be realized as radially outer or radially inner areas of the ring, closed on the circumference and axially offset from one another. With such an easily manufactured shape, it can also be possible to generate relatively large frictional forces. In this case, a large portion of the surface area of the friction ring can essentially be in contact with the corresponding contact surfaces of the input part and the output part. The service life can essentially also be significantly improved as a result of such even loading.

In addition to the above, it can also be possible to realize the indentations in the form of essentially radially oriented tabs. These radial tabs can preferably be separated, in their circumferential end regions, by means of approximately radially oriented partial cuts. The use of such embodiments can be particularly appropriate when the adjustment of the frictional force is difficult.

The tabs can also be oriented essentially circumferentially, whereby the tabs can preferably be separated by means of radial and circumferential partial cuts. With such a configuration, a wide range of adjustments can be possible, primarily with respect to lower frictional forces.

In an additional advantageous embodiment, the present invention teaches that the partial indentations can be formed by a circumferential, corrugated structure of the friction ring. But the corrugated structure can also be oriented radially. In both cases, the result is a particularly simple friction ring shape which can be correspondingly economical to manufacture.

According to another embodiment of the present invention, the friction ring can have three radially superimposed ring regions, of which the radially outermost and the radially innermost can preferably be oriented in one axial direction, and the middle region can be oriented in the other axial direction. By means of such a configuration, a precise adjustment of the frictional force can essentially be possible even with a relatively high pressure and a high friction effect.

By means of a non-rotational attachment of the friction ring to preferably, but not exclusively, the output part of the torsional vibration damper, the point at which the frictional force is generated can essentially be guaranteed with essentially absolute certainty, so that in this case, no change of the friction surfaces can occur.

An additional feature of the present invention provides a clutch plate in which the hub disc, with an inside toothed portion, is engaged non-rotationally in an outside toothed portion of the hub with clearance in the circumferential direction. For this clutch plate, there can preferably be one cover plate located on each side of the hub disc, wherein, both cover plates can preferably be rigidly connected to one another and held at a fixed distance. One of the cover plates can preferably have a friction lining. One cover plate can preferably be mounted on the hub via a guide element and this guide element can essentially represent an axial support against a contact surface on the hub. A no-load damping system can be active in the vicinity of the clearance of the toothed portion, and the friction ring system can preferably be located on the side of the hub disc opposite the guide element, essentially between the toothed portion and the other cover plate. Such an arrangement, with the friction ring system on one side of the hub disc, can essentially be particularly advantageous with respect to easy installation and assembly.

The friction ring arrangement can thereby preferably be formed by a single friction ring, which single friction ring can have three annular areas radially above one another. Of these three annular areas, the radially outermost area can preferably be in contact with the hub disc, the radially innermost area can preferably be in contact with the end face of the outside toothed portion, and the middle area can be in contact with the inside of the cover plate. Despite such a simple design, such a configuration of the friction ring arrangement can be capable of generating friction while at idle as well as under load. To coordinate the various frictional forces, the present invention therefore teaches, for example, that the friction ring can vary in shape over its radial span, for example, it can be preferable for the cross-section in the region of the outside toothed portion to be thinner than the cross-section at the radially outermost area. By this means, the frictional force for the idle damping apparatus can be kept low.

However, it is also possible to locate two different friction rings, one radially about the other, such that the radially inner friction ring preferably extends from a concentric guide surface of the hub to the outside diameter of the outside toothed portion, and the radially outer ring extends radially outward from approximately the outside diameter of the outside toothed portion. While the use of two rings can naturally increase the expense of the friction rings, the use of two rings can make it possible to set and adjust the frictional forces independently of one another.

In a further embodiment of a torsional vibration damper in accordance with the present invention, the hub disc, at least in the area of its inside toothed portion, with the side facing toward the other cover plate, can be axially recessed with respect to the outside toothed portion of the hub. As such, the present invention teaches that the inside diameter of the radially outermost friction ring can be centered on that end region of the outside toothed portion which is free from the inside toothed portion. Thus, it can be possible to select a particularly simple design for this friction ring and to center this ring over the outside diameter of the existing outside toothed portion.

In one particularly advantageous configuration of the friction ring arrangement, the present invention teaches that the radially inner friction ring, on the side opposite the other cover plate, preferably has at least two axially separated projections which are molded as one piece with the ring, and which projections are non-rotationally engaged in corresponding openings in the hub. By means of this non-rotational connection, the active friction surface can essentially be defined in advance. Thus, there can be essentially no changing of the friction surface. The axially separated projections, which can at least be molded onto the ring body, can be altogether sufficient to transmit the torque and get around the problem encountered when there are multiple projections, namely the problem of pitch errors which can occur.

In a further embodiment of the torsional vibration damper in which the hub disc, at least in the area of its inside toothed portion, with the side facing toward the other cover plate, can be axially recessed with respect to the outside toothed portion of the hub, the present invention teaches that the projections can preferably be engaged in openings in the form of axial gaps in the external toothed portion of the hub. In this manner, the existing driving devices can essentially be utilized, which makes economical manufacture possible.

The contour of the projections can essentially correspond to the contour of the toothed portions. It can thereby essentially be guaranteed that the surface pressure will be reduced to a minimum during the generation of the friction moment.

To achieve particularly simple installation and assembly, the present invention teaches that the projections can preferably have an axially conical shape, and can become narrower away from the friction ring. The conical projections can be more easily threaded into the toothed portion of the hub and when fully inserted, the projections can preferably be in full load-bearing contact against the toothed portion of the hub, so that there can essentially be no clearance in the circumferential direction.

The invention teaches that there can be additional axial projections which can preferably be distributed around the circumference and which can be shorter in the circumferential direction than the spaces in the outside toothed portion. These additional projections essentially do not interfere with installation or assembly and, on account of their special configuration, pitch error problems essentially can not occur. These additional projections can essentially be provided to give a measure of security whereby in the event of any wear of the first axial projections, these additional projections can preferably protect against relative rotation with respect to the hub. The manufacturing tolerances of these additional projections can be somewhat less stringent than for the other projections, at least in the circumferential direction.

In one preferred embodiment, the friction ring can preferably be designed so that when viewed along the circumference, the regions with projections alternate with regions with partial indentations in the form of wave peaks for the generation of an internal axial stress.

For radial centering and for the definition of the friction surface, the present invention also teaches that the radially outer friction ring can be non-rotationally engaged, by means of axial projections, in areas which are extended radially inward for the aperture for the torsion springs. By this means, the apertures which are already present in the radially outer friction ring can be slightly modified to establish a non-rotational connection.

The present invention also teaches that at least one of the two friction rings can preferably have discontinuities, or gaps in the region adjacent to the inside of the cover plate. Into these discontinuities, at least in the neutral position of the clutch plate, local impressions on the cover plate can preferably be engaged with clearance in the circumferential direction. In this manner, the frictional force can be more precisely coordinated as a function of the angle of rotation after the clearance has been used up. As such, it can thus be possible to realize multi-stage generation of frictional force with a single friction ring. The magnitude of the clearance can essentially be a measure of the torsional angle after which the increased friction occurs. It can thereby be possible to specify this clearance, starting from the rest position of the clutch plate, for both relative directions of rotation, and it can also be possible to design the clutch so that this clearance can be of different sizes.

It is particularly advantageous if the torsional vibration damper can be located inside a clutch plate, since the clutch plate itself, which is costly and complex in terms of parts, can be simplified and realized in a more compact fashion.

It is also advantageous to install the torsional vibration damper between the two masses of a dual-mass flywheel, which masses can rotate relative to one another. The use of a compact apparatus with a simple design to dampen torsional vibrations at this point can make possible a compact overall arrangement with corresponding adjustment possibilities.

The above-mentioned concepts of the present invention will be discussed further herebelow with reference to the accompanying figures. It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a friction clutch for a drive train of a motor vehicle, the friction clutch comprising: a rotary power input member; a housing; a clutch disc disposed within the housing, the clutch disc defining an axis of rotation and an axial direction parallel to the axis of rotation; pressure plate apparatus disposed within the housing and movable in the axial direction, the pressure plate apparatus for applying an axial force to the clutch disc along the axial direction for engaging the clutch disc with the rotary power input apparatus; biasing apparatus for biasing the pressure plate apparatus in the axial direction to apply the axial force to the clutch disc; the clutch disc comprising: hub apparatus, the hub apparatus comprising: a hub portion for engaging shaft apparatus of a transmission; and a hub disc disposed about the hub portion and extending radially from the hub portion, the disc-shaped portion having a first side and a second side; at least one cover plate disposed adjacent the hub disc, the at least one cover plate being rotationally mounted on the hub portion for relative rotational movement with respect to the hub disc; damping apparatus for damping relative rotational movement between the hub disc and the at least one cover plate; friction lining apparatus connected to the at least one cover plate for being engaged between the pressure plate apparatus and the rotary power input apparatus; at least one friction ring disposed about the hub portion and axially pre-stressed between the hub apparatus and the at least one cover plate; the at least one friction ring comprising a first portion, the first portion being substantially ring-shaped and defining a plane substantially radially with respect to the axis of rotation, the first portion for contacting one of: the hub apparatus, and the at least one cover plate; and at least one second portion, the at least one second portion extending axially away from the first portion a substantial distance in the axial direction, and the at least one second portion for contacting the other of: the hub apparatus, and the at least one cover plate.

Another aspect of the invention resides broadly in a torsional damper for a drive train of a motor vehicle, the torsional damper comprising: a rotary power input member, the rotary power input member comprising a first disc-shaped member; a rotary power output member, the rotary power output member comprising a second disc-shaped member, the second disc shaped member comprising a hub, the hub defining an axis of rotation; biasing apparatus disposed between the input member and the output member to dampen relative rotational movement between the input member and the output member; at least one friction ring disposed about the hub and axially pre-stressed between the input member and the output member; the at least one friction ring comprising: at least a first portion for contacting one of: the input member and the output member; at least one second portion for contacting the other of: the input member and the output member; and apparatus for providing an evenness of frictional force at the contacting portions during wear of the friction ring.

BRIEF DESCRIPTION OF THE DRAWINGS

Several embodiments of the present invention are described in greater detail herebelow and are illustrated in the accompanying drawings, in which:

FIGS. 2–5 show embodiments of a friction ring with a cross section, top and partial views;

FIGS. 6a, 6b, 7a, 7b, 8a and 8b show partial views of various friction rings;

DESCRIPTION OF THE PREFERRED EMBODIMENTS

Figure 1:
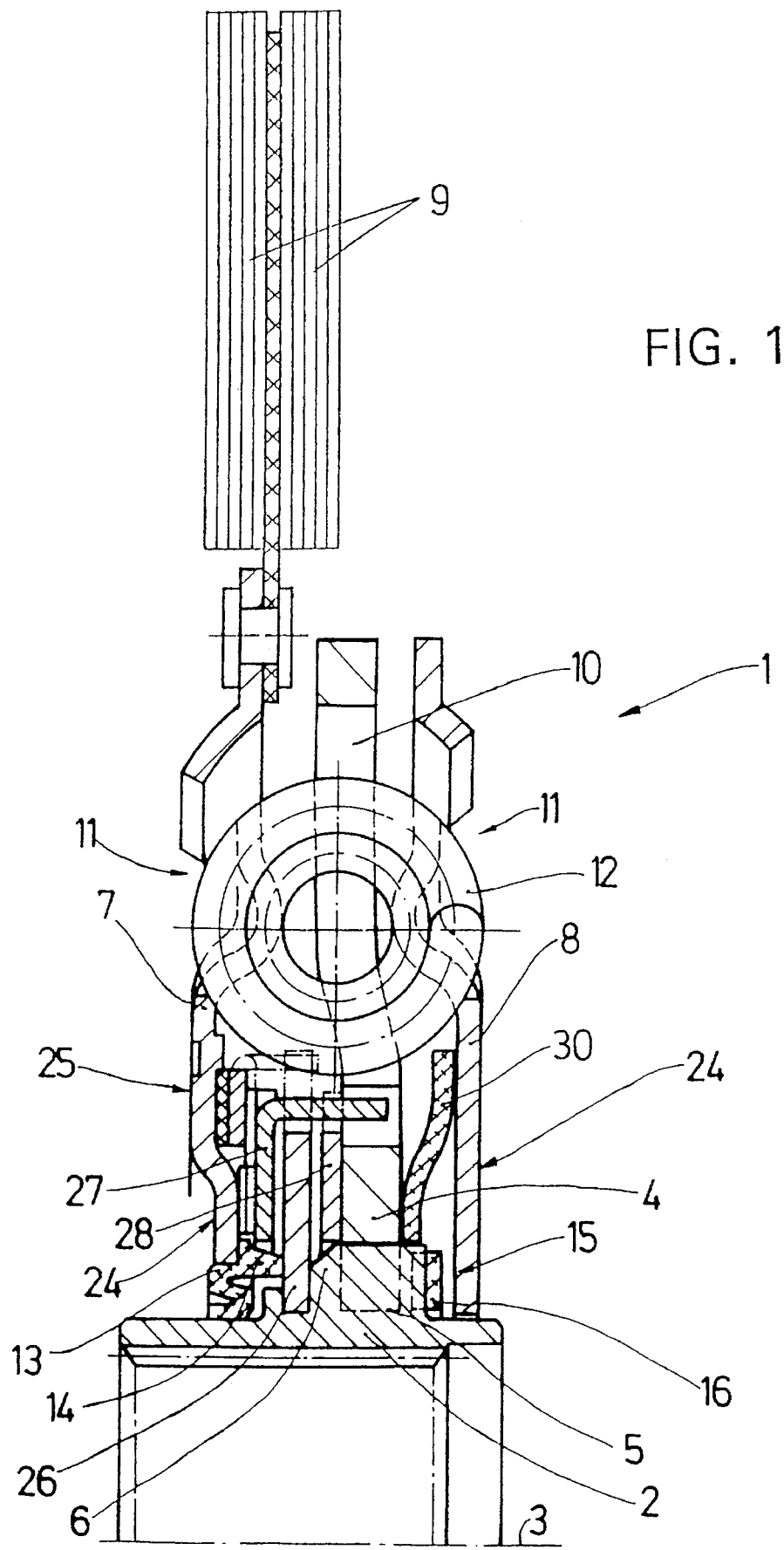
FIG. 1 shows a longitudinal section through the upper half of a clutch plate.

FIG. 1 shows a clutch plate 1 as completely assembled. The clutch plate 1 can preferably be concentrically oriented with respect to an axis of rotation 3 and can have a hub 2, on which hub 2 two cover plates 7 and 8 can preferably be guided, at least radially, by means of guide element 13 of the cover plate 7, for example. The two cover plates 7 and 8 can preferably be non-rotationally connected to one another and can be held a fixed distance apart. The friction linings 9 can preferably be disposed on the radially outside portion of one of the cover plates 7 and 8 (shown on the cover plate 7).

A hub disc 4 can preferably be located axially between the two cover plates 7 and 8. The hub 2 can preferably have an outside toothed portion 6 and the hub disc 4 can preferably have an inside toothed portion 5. The hub disc 4 can point radially inward, and can be oriented by means of the toothed portion 5 so that the hub disc 4 essentially cannot rotate relative to the hub 2.

Figure 1A:
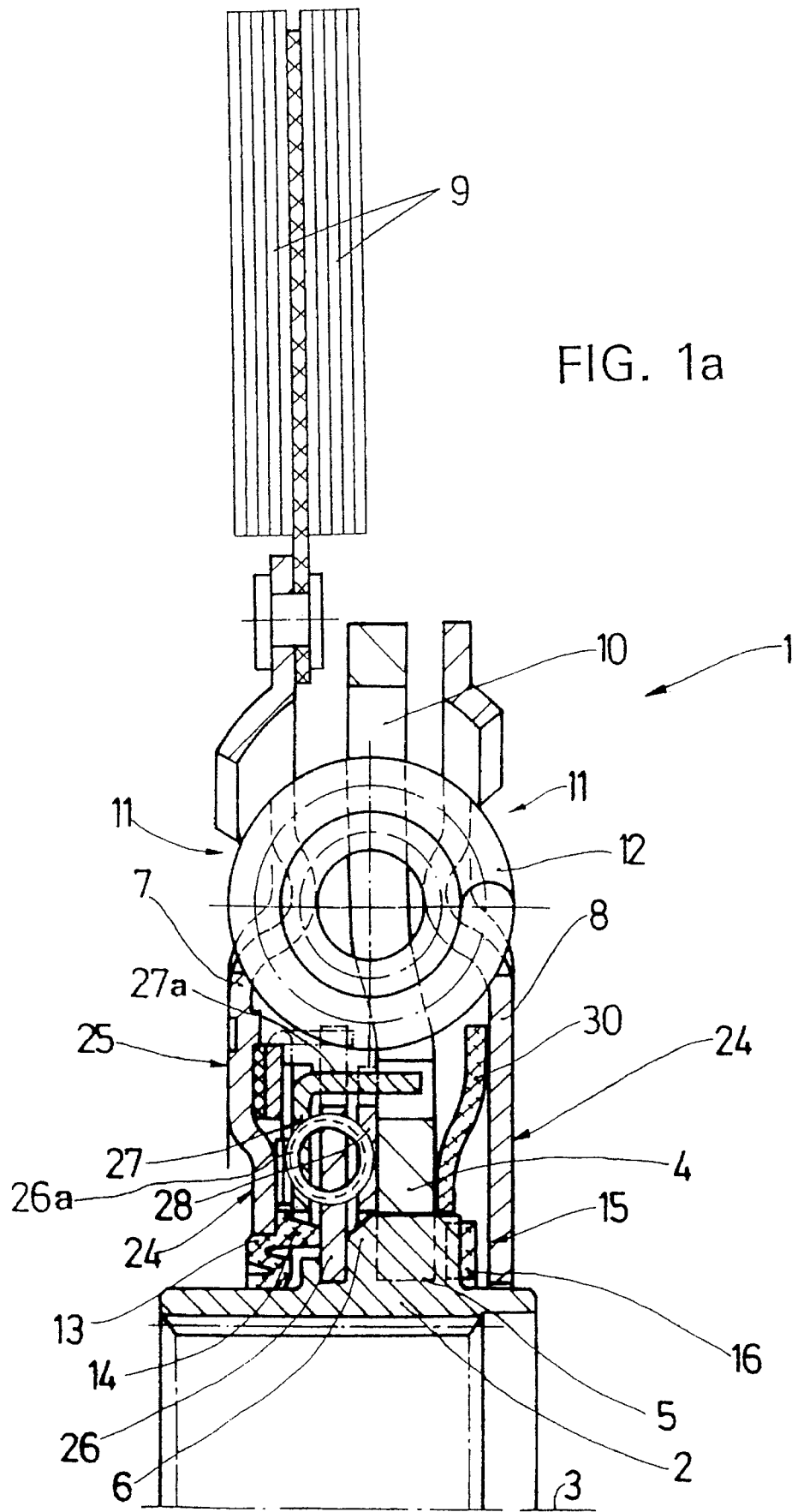
FIG. 1a shows an alternative longitudinal section through a clutch plate.

Springs 12 can be provided in apertures, or windows, 10 of the hub disc 4 and in apertures 11 of the cover plates 7 and 8. The springs 12 can essentially be pressurized by the clutch plate 1 during the transmission of torque, and can thus essentially ensure a relative rotation between the cover plates 7 and 8 with the friction linings 9, on the one hand, and the hub disc 4 with the hub 2 on the other hand, preferably to reduce torsional vibration. In this case, there can preferably also be a no-load spring apparatus that can preferably be formed by a hub disc 26 with cover plates 27 and 28 on either side, as well as springs 26a, which are shown in FIG. 1a. Such springs 26a are generally well known and are typically located between the hub disc 26 and the cover plates 27 and 28 in corresponding apertures, much the same way that the springs 12 are located in apertures 10 and 11. The hub disc 26 can preferably be rigidly connected to the hub 2, and the two cover plates 27 and 28 can preferably be non-rotationally connected to the hub disc 4, essentially by means of tabs 27a (see FIG. 1a) of cover plate 27, which tabs 27a preferably extend substantially axially to engage the cover plate 28 and hub disc 4.

In this example of an arrangement of a no-load spring apparatus, it can typically be necessary for the hub disc 4 with its toothed portion 5 to have some circumferential clearance with respect to the toothed portion 6 in the hub 2. The no-load spring apparatus preferably operates inside this circumferential clearance. However, it can also be possible to realize the current invention for a clutch plate which does not have a no-load spring apparatus, in which case the toothed portions 5 and 6 can be realized circumferentially with zero clearance, or can even be eliminated entirely. As such, it might be possible to provide the hub disc 4 as an integral part of the hub 2.

In addition to the above components, the clutch plate 1 can preferably contain various friction devices, specifically a friction device numbered 24 for operation under load, and possibly an additional entrained friction device 25. Such a friction device 25 is generally well known in the art, and therefore its design need not be described in greater detail here.

The load friction device 24 can preferably be formed by a friction ring 30, preferably disposed on the right side of the clutch plate 1, which friction ring 30 can preferably be located between the inside of the cover plate 8 and the radially inner region of the hub disc 4. In this case, the hub disc 4, on the outside toothed portion 6 of the hub disc 2, can preferably be axially so far removed from the cover plate 8 that the friction ring 30 can be moved radially on the resulting shoulder of the outside toothed portion 6. The friction ring 30 can preferably have a shape which is illustrated in greater detail in FIG. 6.

The friction ring 30 can preferably be designed with an axial prestress, and in the vicinity of its inside diameter can preferably be in frictional contact with the inside of the hub disc 4. The force resulting from the prestress of the ring 30 can essentially be transmitted, via the cover plate 8 and the connecting elements (not shown but well known) between the cover plates 8 and 7, to the cover plate 7. From the cover plate 7, the force can be transferred via a friction ring, which could be friction device 25, to the no-load cover plate 27, which plate 27 can be supported axially against the no-load cover plate 28, and which plate 28, in turn, preferably rests against the hub disc 4. The force path can thus essentially be closed, and essentially cannot be the source of influences on a base friction device 15 as discussed herebelow. The load friction apparatus 24 can thus essentially operate when there is a relative rotation between the two cover plates 7 and 8, on the one hand, and the hub disc 4 on the other hand. The friction ring 30 can preferably be made of plastic and can essentially be used to generate both the frictional force, and the prestress force for this frictional force.

Figure 1B:
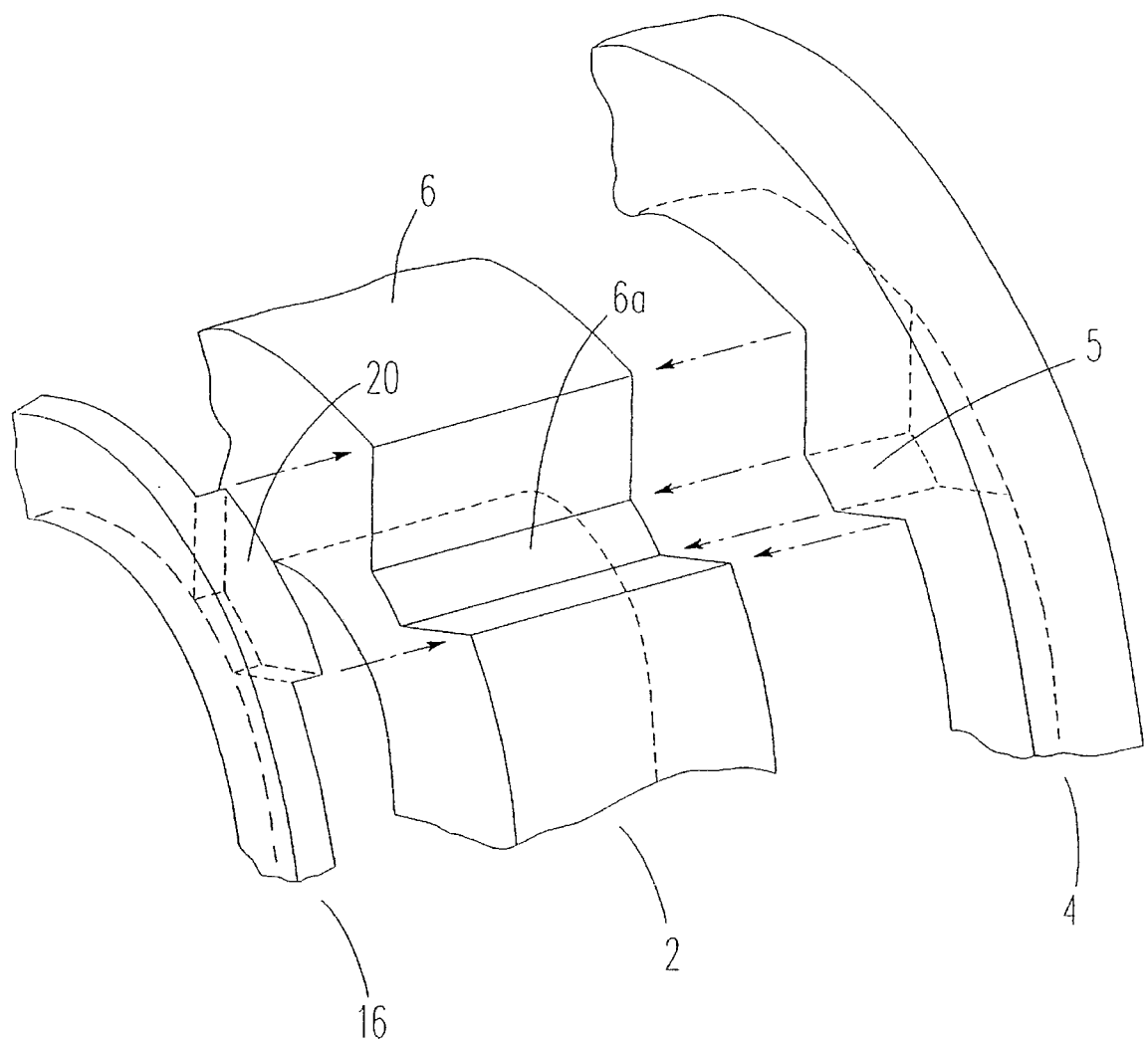
FIG. 1b shows a partial exploded view, in perspective, of a hub 2, friction ring 16 and hub disc 4.
Figure 3:
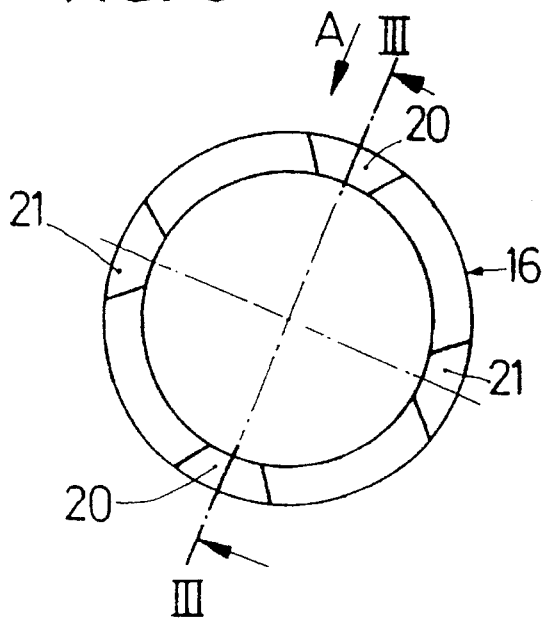

There can also preferably be a base friction device 15 which can be effective in both the no-load range and the load range. This friction device 15 can essentially be of particular value in terms of adjustments, or tuning of the clutch plate 1. In this case, the base friction device 15 can essentially be formed by an axially oriented leg 14 of the guide element 13 in the cover plate 7, and a friction ring 16, preferably disposed between the end of the outside toothed portion 6 of the hub 2 and the cover plate 8. The friction ring 16 can preferably be non-rotationally connected in a manner as depicted in FIG. 1b, and which will be explained in greater detail below, to the hub 2 to achieve a clear definition of the friction surface with respect to the inside of the cover plate 8. The friction ring 16 can preferably be designed with an internal axial stress and the force of the axial stress can essentially be transmitted, via the cover plate 8 and the connecting elements between the cover plates 8 and 7, to the cover plate 7, and via the guide element 13, to the hub disc 26 of the no-load spring apparatus (26, 27, 28). Because the hub disc 26 can preferably be non-rotationally connected to the hub 2, the force path can essentially be closed here, too. As a result, the prestress forces of the base friction apparatus 15 and the load friction apparatus 24 can essentially be adjusted independently of one another.

Some examples of types of plastics which can possibly be used for forming friction rings 16, 30, for example, may possibly include: polyvinyl chloride; polystyrene; phenol-formaldehyde resin; methyl methacrylate; polyolefins (polyethylene, polypropylene, polytetrafluoroethylene); polyamides; polyesters; and polyurethanes.

One embodiment of the friction ring 16 is shown in FIGS. 1b and 2 through 5. The friction ring 16 can preferably be circular in shape and can preferably be installed so that the friction ring 16 is substantially concentric to the axis of rotation 3 in the clutch plate 1. The friction ring 16 can preferably have axially oriented first projections 20 located in at least two points on the circumference thereof. The contour of the projections 20 can preferably be configured such that the projections 20, as shown in FIG. 1b, can be engaged axially in the tooth spaces 6a of the toothed portion 6 of the hub 2 and can thus precisely be coordinated with one another essentially without clearance in the circumferential direction.

An arrangement having two axial projections 20 can be advantageous in that pitch errors in the circumferential direction, which pitch errors would make precise installation or assembly of the friction ring 16 more difficult, can essentially be prevented. As shown in FIG. 4, it can be advantageous if these axial projections 20 of the friction ring 14 are substantially conical when viewed in the axial direction, so that during installation of the friction ring 16, the friction ring 16 can essentially be easily inserted into the toothed portion 6 of the hub 2. The circumference of these axial projections 20, represented by the dimension X in FIG. 4, can preferably be configured such that zero clearance with respect to the tooth spaces 6a of toothed portion 6 of the hub 2 can essentially be ensured in a base region 20a, i.e., the transitional region between the projections 20 and the base body of friction ring 16. The circumferential contour of these axial projections 20 can preferably be aligned with the contour of the space width of the toothed portion 6. In this manner, a slight surface pressure on the circumference can be realized.

It can also be possible to have additional, second axial projections 21 on the circumference of the friction ring 16. These second axial projections 21 can preferably be configured as shown in FIG. 5, i.e., they can be defined circumferentially by the dimension Y. This dimension Y can preferably be smaller than the dimension X in FIG. 4. On the one hand, the smaller dimension Y can essentially prevent problems caused by pitch errors during installation of the friction ring 16, and on the other hand, can essentially ensure that, in the event of wear of the first axial projections 20 in the circumferential direction, the additional axial projections 21 can then ensure a transmission of force in the circumferential direction. The tolerances for the dimension Y of the projections 21 can thus preferably be more liberal than those for the projections 20 shown in FIG. 4.

Figure 2:
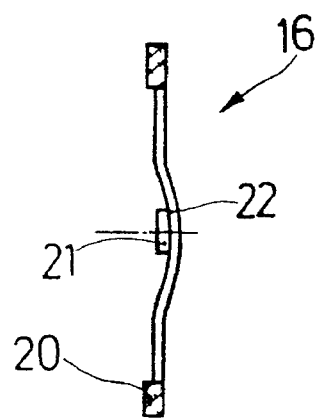
Figure 2A:
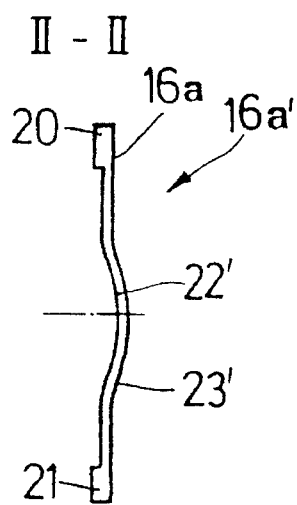
Figure 3A:
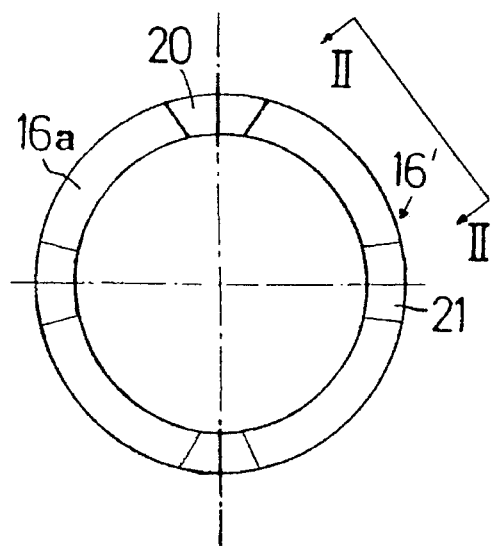

A variant embodiment of a friction ring is illustrated in FIGS. 2a and 3a. The friction ring 16a', in terms of its axial projections 20, is essentially the same as the friction ring 16 illustrated in FIGS. 2 to 5, but the base body 16a here is corrugated, or bent in the axial direction, in the circumferential areas which are located between the projections 20. The base body 16' can have corrugation crests 22' which preferably project toward the cover plate 8, which cover plate 8 is illustrated in FIG. 1. The corrugation crests 22' each preferably have a flat surface area 23'. This presence of corrugation crests 22', end the resulting axial elastic action of the friction ring 16', can preferably provide an axial spring force for the friction ring 16'. The friction ring 16' can preferably be installed in the axial direction between the ends of the toothing 6 and the cover plate 8 under an axial prestress to thereby generate the axial force. Naturally, the second axial projections 21 added to the friction ring 16 can also be present with the friction ring 16'. When the friction ring 16' is installed, the second axial projections 21 can then also be at least partly engaged in the toothing 6 under axial prestress.

FIGS. 6a and 6b show a cross section and a partial plan view of a friction ring 17 with a very simple design. The friction ring 17 can preferably have a closed circumference and can also have an encircling outer ring region 31 and an encircling inner ring region 32, whereby both ring regions 31 and 32 can be connected to one another preferably by means of a diagonal middle piece 31a. The friction ring 17 can preferably be designed so that when installed, i.e., when clamped in place by axial force, the friction ring 17 preferably rests with its annular regions 31 and 32 flush against the inside of the hub disc 8 or the corresponding part of the hub 2. In this form, ring 17 can essentially be used for both the load friction device 24 and for the base friction device 15. The axial clamping force provided by the ring 17 can essentially be a function of the material strength of the friction ring 17 and the axial space available for installation, for example the axial space between parts 4 and 8 for friction device 24, or between parts 6 and 8 for friction device 15.

FIGS. 7a and 7b show a variant of the arrangement in FIGS. 6 and 6a, whereby in this case, a friction ring 18 preferably has an even base shape from which tabs 33 are realized by means of partial axial outs 34. The tabs 33 preferably run essentially radially outward, at an angle axially, and can thus essentially be used for the generation of an axial force.

FIGS. 8a and 8b show another variant of a friction ring 19. In this variant, the friction ring 19 preferably has essentially circumferentially oriented tabs 35, which tabs 35 likewise preferably extend axially to thereby produce an axial clamping force. The tabs 35 can be either single-bladed, or double-bladed, wherein double-bladed tabs are shown in FIGS. 8a and 8b, and single-bladed tabs could be represented by either the left-hand, or right-hand tabs shown in FIGS. 8a and 8b. To form the tabs 35, a partial cut 37 can preferably be made from the radial outside, and a partial cut 36 can preferably be made circumferentially. Such an arrangement can be present in at least two locations on the circumference of the friction ring 19. For friction rings having tabs, i.e., rings 18 and 19, the frictional force generated can essentially be varied by means of the number of these tabs.

Figure 9:
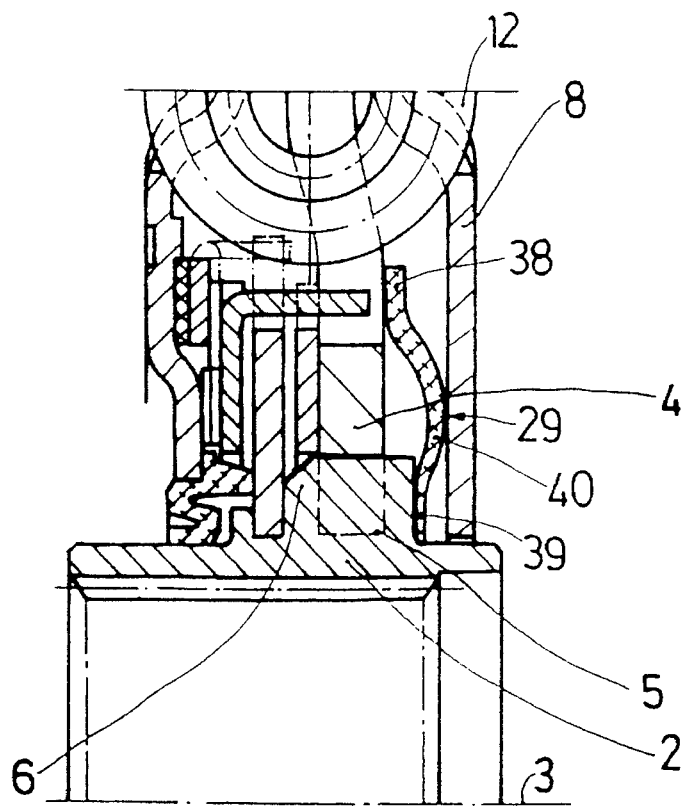
FIG. 9 shows a partial longitudinal section with circumferentially non-fixed friction rings.

FIG. 9 shows a partial section through a clutch plate in which frictional forces can essentially be generated by a particularly simple means for both the base friction and the load friction. In this case, there can preferably be a single friction ring 29, which friction ring 29 preferably extends radially from the hub 2 to the hub disc 4. The ring 29 preferably can have three annular regions 38, 39 and 40, radially one above the other. Of the annular regions, the radially outermost ring region 38 and the radially innermost ring region 39 can preferably face, or bend away from the cover plate 8 and the middle ring region 40 can preferably be oriented toward the cover plate 8. In the installed state shown in FIG. 9, the friction ring 29 preferably rests with its middle ring region 40 preferably against the cover plate 8, with its radially outermost ring region 38 preferably against the hub disc 4, and with its radially innermost ring region 39 preferably against the hub 2 in the vicinity of the outside toothed portion 6. To tune the various frictional forces, the friction ring 29 can preferably be configured to have different material thicknesses over its radial span. As shown in FIG. 9, it can be preferable for the cross-section in the region 39 adjacent the outside toothed portion 6 to be thinner than the cross-section of the regions 38 and 40.

During operation of the friction apparatus of FIG. 9 in the no-load range, that is, when the cover plates 7 and 8 and the hub disc 4 are essentially moving in the same direction within the clearance of the toothed portion 5 and 6, the friction ring 29 preferably moves together with the cover plates 7 and 8 and the hub disc 4 relative to the hub 2, and preferably generate friction by means of the relative motion of its radially innermost ring region 39 with respect to the end face of the outside toothed portion 6 of the hub 2. When the clearance between the toothed portion 5 and 6 is exceeded, the cover plate 8, together with the cover plate 7, can move relative to the hub disc 4 and the hub 2 (which hub disc 4 and hub 2 must essentially be considered as single part together with the toothed portions 5 and 6). A relative motion can preferably be created in this manner between the cover plate 8 and the hub disc 4, so that friction force can preferably be generated either between the ring region 38 and the hub disc 4, or between the ring region 40 and the cover plate 8. The frictional force generated in either of these two locations can essentially be relatively large, since the friction force would typically be generated in the thickest region of the friction ring 29.

Figure 10A:
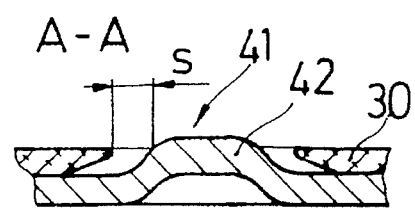
FIGS. 10 and 10a show sections of a friction ring arrangement with variable frictional force generation as a function of the torsional angle.
Figure 10:
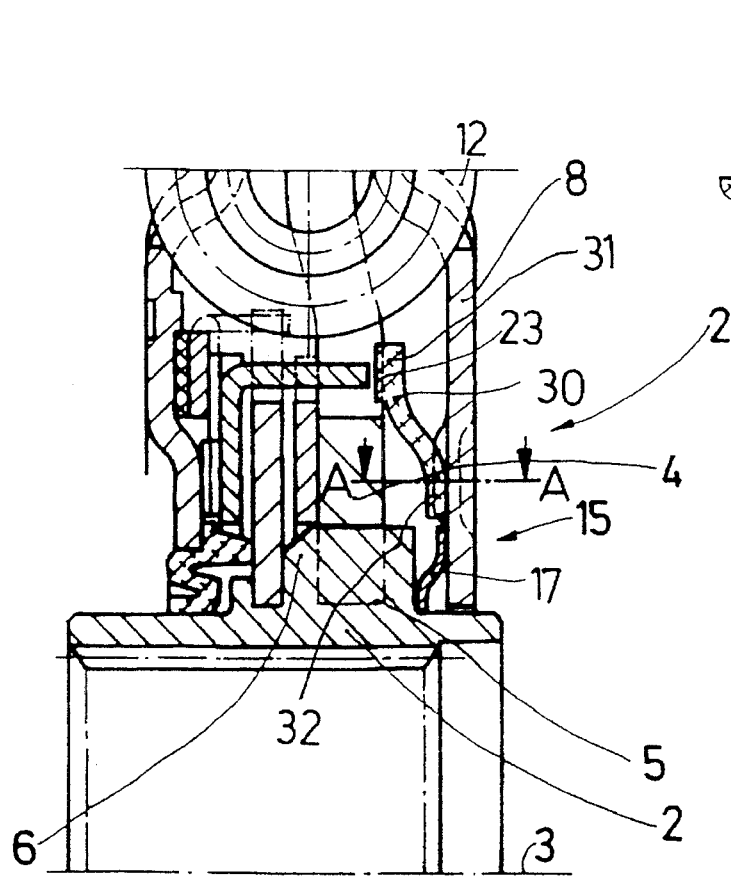

The design shown in FIGS. 10 and 10a uses a friction ring 17, as shown in FIGS. 6a and 6b, in the base friction apparatus 15. The load friction apparatus 24 contains a friction ring 30, the basic structure of which is similar to the friction ring 17, and can also be considered to be essentially the same as the friction ring 30 in FIG. 1, but inverted. This ring 30 preferably has a radially outer ring region 31 and a radially inner ring region 32. The inner ring region 32 can preferably be in contact with the inside of the cover plate 8 and the outer ring region 31 can preferably be in contact with the hub disc 4. The outer ring region 31 can preferably have axial projections 23. These projections 23 can preferably be engaged, essentially circumferentially without clearance, in openings in the hub disc 4. The friction ring 30 can thus preferably be circumferentially fixed with respect to the hub disc 4, while also being fixed in the radial direction. When there is relative rotation between the cover plate 8 and the hub disc 4, that is, in the load region, this friction ring 30 can essentially generate a frictional force with respect to the inside of the cover plate 8. As can be seen from the Section A—A shown in FIG. 10a, there can preferably be discontinuities, or gaps 41 in the inside ring region 32 of the friction ring 30. Partial indentations 42 of the cover plate 8 can preferably extend into these gaps 41. The gaps 41 can preferably have a larger circumference than the indentations 42. By means of such a configuration, the frictional force generated when the cover plate 8 rotates relative to the hub disc 4 can essentially be increased after a distance (S) has been traversed. Once the distance (S) is traversed, the pre-stress of the friction ring 30 can be increased by means of the indentations 42. The indentations 42, upon a further displacement between cover plate 8 and hub disc 4 beyond the distance S, can cause the indentations 42 to move out of the gap 41 and onto the ring region 32, thereby axially displacing the ring region 32 and increasing the axial pre-stress. The increase in frictional force can essentially be precisely controlled by means of the number of discontinuities 41 and indentations 42 on the circumference. It can thus essentially be possible to increase the friction force in the load damping range by a factor of two or more.

The size of the clearance (S) can, of course, also vary in both directions of rotation, there causing the increased friction force to occur after different degrees of relative rotation between cover plate 8 and hub disc 4. Furthermore, such a graduated, or stepped, friction apparatus can also be used together with the friction ring 17 of the base friction apparatus 15. In other words, such a configuration of gaps 41 and indentations 42 could also possibly be provided for the friction ring 17 in at least one embodiment of the invention.

Figure 11:
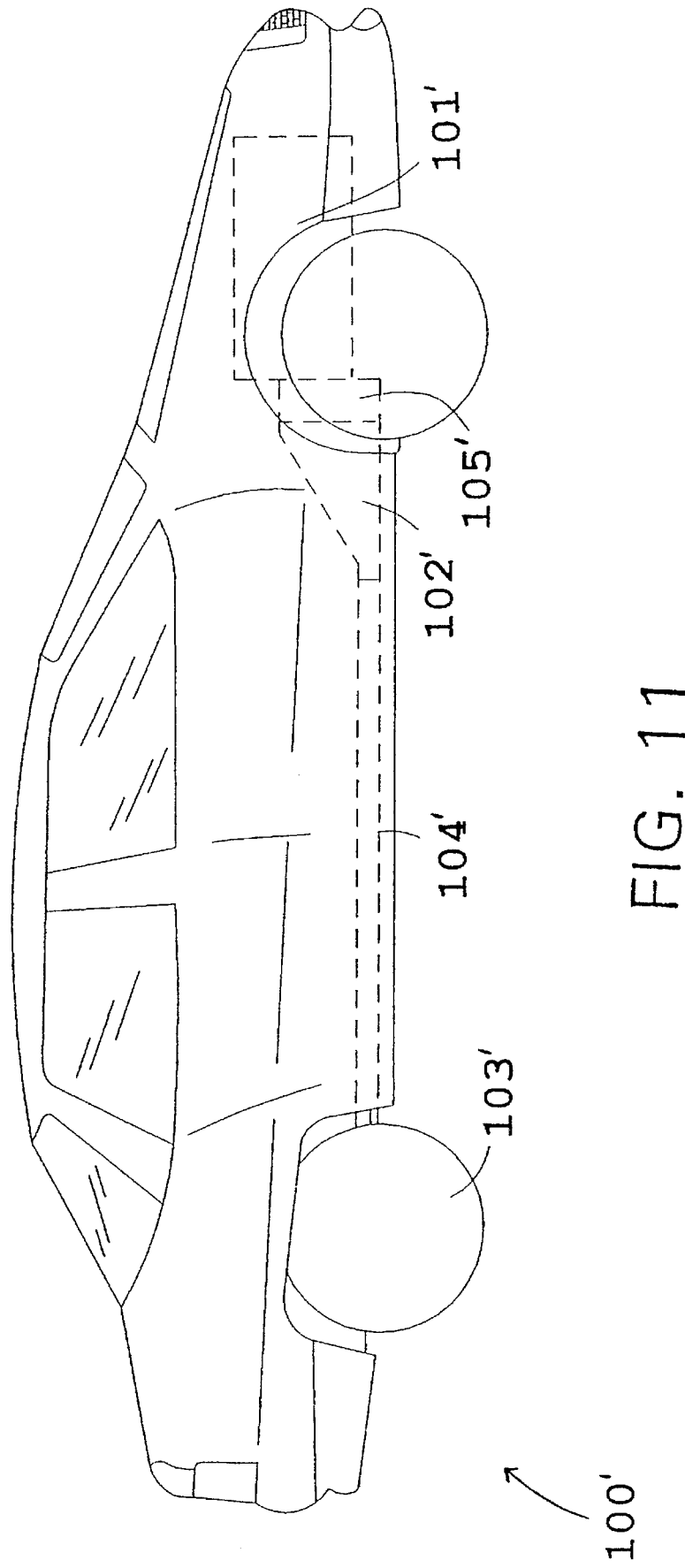
FIG. 11 shows a general depiction of a motor vehicle power train.

The above discussed clutch plate and components thereof can essentially be used as a component of a motor vehicle and corresponding power transmission components such as are generally shown in FIG. 11. A motor vehicle 100' could typically have an internal combustion engine 101' mounted in a forward portion thereof. The motor vehicle 100' could also typically have a transmission 102' for transmission of mechanical power from the engine 101' to the rear vehicle wheels 103' via a drive shaft 104'. A friction clutch 105' could preferably be provided, in accordance with the present invention, for engaging the transmission 102' with the engine 101'.

Figure 12:
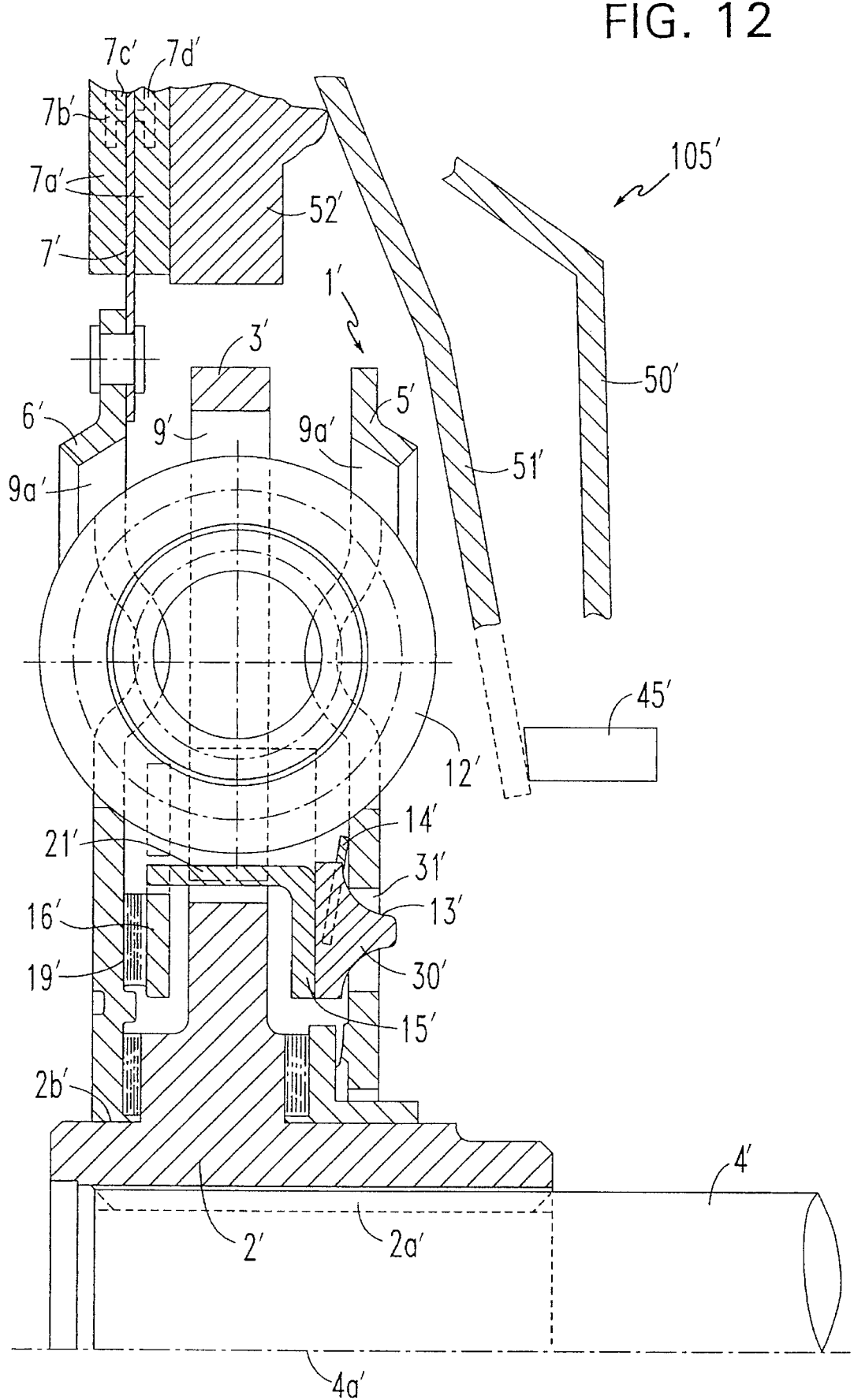
FIG. 12 shows a sectional view of an alternative embodiment of a friction clutch.

An alternative embodiment of a clutch plate, and friction clutch in general, are depicted in FIG. 12, and components as depicted therein might be interchangeable with components as previously discussed above. A friction clutch 105' can generally have a clutch disc 1', which clutch disc 1' can have a hub 2' that can be configured to be mounted non-rotationally on a transmission shaft 4'. Such a mounting can be provided, for example, by means of a toothing 2a' disposed within the hub 2', which toothing 2a' would preferably be configured to correspond to similar toothing on the transmission shaft 4'. In general, the transmission shaft 4' defines an axis of rotation 4a', about which the hub 2' rotates.

As is also shown in partial section in FIG. 12, the friction clutch 105' could also preferably have a housing 50' for housing the components of the clutch therein. Within the friction clutch 105', the hub 2' of the clutch plate 1' can preferably be provided with a hub disc 3', which hub disc 3' can be integral with the hub 2', and which hub disc 3' can point radially outward from the hub 2'.

On both sides of the hub disc 3', cover plates 5' and 6' can preferably be provided, which cover plates 5' and 6' can be fixed in relation to one another, and held at an axial distance in relation to one another. At least one of the two cover plates, for example, the cover plate 6', as shown in FIG. 12, in its radially outer region, can preferably have a lining support 7', to which friction linings 7a' can be fastened. The two cover plates 5' and 6', for example, can preferably be guided in the radial direction, by means of a bore in one of the two cover plates 5', 6', on a cylindrical guide surface 2b' of the hub 2'.

As shown in FIG. 12, the friction rings 7a' can preferably be connected to one another and to the lining support 7' by means of a fastening rivet 7b', which fastening rivet 7b' preferably runs through a passage 7c'. The rivets 7b' can preferably form a non-detachable connection to the corresponding lining supports 7' by means of a rivet head 7d', which holds the rivet 7b' in place.

Within the housing 50' there could also preferably be a pressure plate device 52' for applying an axial force to the friction linings 7a' to engage the linings 7a' with a counter-thrust plate (not shown) which would essentially be rotating with the engine, to thereby cause the hub disc 3' to also rotate with the engine and turn the shaft 4'. The pressure source for applying this axial pressure to the pressure plate device 52' could preferably be a biasing member, such as a spring device 51', which can bias the pressure plate 52' away from the housing 50' into engagement with the friction linings 7a'. In addition, as shown schematically in FIG. 12, a pressure release device 45' can be provided for relieving the pressure of the pressure plate 52' on the friction linings 7a'. Such a device 52' can in essence work against the biasing force of spring device 51'. Such arrangements of pressure plate device 52', biasing members 51', pressure relief device 45' and housing 50' are generally well known, and are therefore shown only schematically in the figures.

In the hub disc 3' there will typically be windows 9' in which windows, coil springs 12' will generally be disposed. These coil springs 12' can essentially be disposed about the hub disc 3' over the same average diameter from the axis of rotation 4a', and can also essentially be uniformly placed about the circumference. Similar windows 9a' will typically be located in the cover plates 5' and 6' also for receiving the springs 12' therein.

As shown in FIG. 12, additional components can preferably be provided radially inside the coil springs 12' and between the cover plates 5' or 6' and the hub disc 3'. On the one side there can preferably be a friction ring 13' with lugs 30' that can be guided in openings 31' of the cover plate 5', a spring 14', and a control plate 15'. On the opposite side there can be a thrust ring 16' and a friction ring 19'. The control plate 15' and thrust ring 16' can preferably be held non-rotationally to one another and at an axial distance from one another, by means of axially-bent tabs 21', which can be provided on either one, or both parts.

Figure 13:
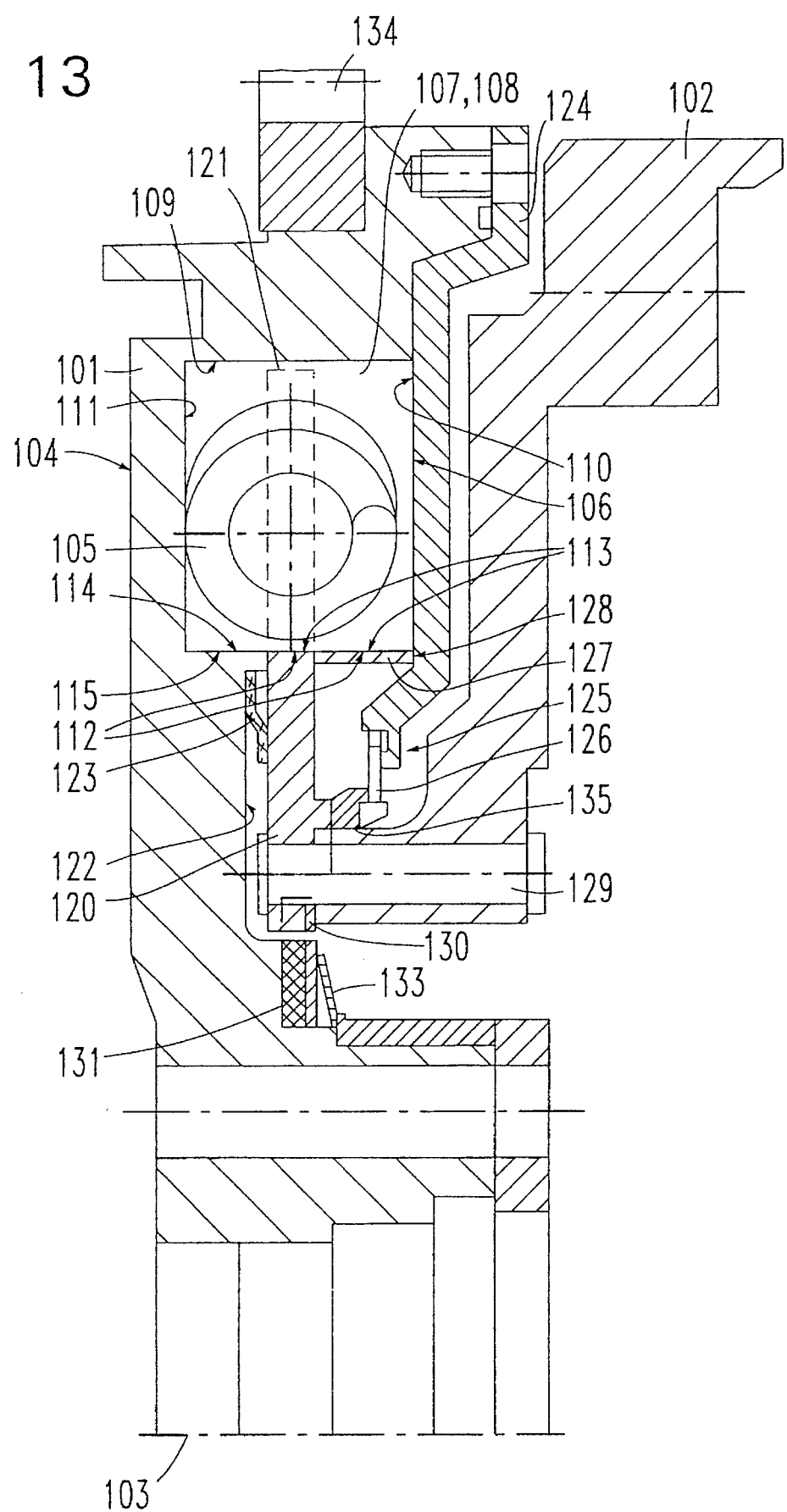
FIG. 13 shows use of such a friction ring in a two-mass flywheel.

FIG. 13 depicts what might be one possible usage of such a friction ring as discussed above in a two-mass flywheel. FIG. 13 shows a partial longitudinal section and a partial cross section of a flywheel which has two centrifugal masses, with a first centrifugal mass 101 which can be rigidly connected to a crankshaft (not shown) of an internal combustion engine, and a second centrifugal mass 102 which can be mounted so that it can rotate essentially on, and with respect to, the first centrifugal mass 101, and which can be connected to a friction clutch as discussed above, by conventional means. Essentially all the parts of the flywheel with two centrifugal masses are oriented concentric to the axis of rotation 103 and can rotate around this axis of rotation 103. About the first mass 101 there can preferably be an external toothing 134 which can be engaged by a starter motor of a motor vehicle for starting an engine connected to the flywheel.

The first centrifugal mass 101, together with a cover plate 124, preferably forms a circular channel 106 which runs concentric to the axis of rotation 103, and in which there are preferably several coil springs 105, each being oriented approximately tangential to the axis of rotation 103 and which are part of a torsion damping device 104 which acts between the two centrifugal masses 101 and 102. This torsion damping device 104 preferably includes several sets of coil springs 105 which act in series.

The coil springs 105 can be located in a channel 106 which is preferably formed in the first centrifugal mass 101, and is preferably bounded by the inside wall 109 as the radial outer limit and the two axial inside walls 110 and 111, whereby the inside wall 111 is preferably formed directly by the first centrifugal mass 101 and the inside wall 110 is preferably formed by the cover plate 124. The cover plate 124 is preferably connected rigidly and in a sealed manner to the first centrifugal mass, or flywheel 101. The sealed connection is essentially necessary because the channel 106 can preferably be at least partly filled with a lubricant or a damping medium.

Preferably extending from a radially inward area into this channel 106 is the hub 120, which can have fingers 121 which project radially outward and are distributed over the circumference so as to actuate the coil springs 105. The coil springs 105 are also preferably actuated by stops (not shown in any greater detail in FIG. 13) inside the channel 106, which in turn are preferably rigidly connected to the first centrifugal mass 101.

On the circumference, between the individual coil springs 105, there are preferably guide shoes 108 which have buffer blocks that support the end surfaces of the coil springs 105. These guide shoes 108 are preferably guided in the channel 106, namely both on the inside wall 109 in a radially outward direction, and on the inside walls 110 and 111 in both axial directions. The end springs of each set of coil springs 105 are preferably guided in spring cups 107 which also have buffer blocks. These spring cups 107 can preferably be actuable both by the fingers 121 of the hub 120 and by the stops (not shown) on the first centrifugal mass 101.

The spring cups 107 and the guide shoes 108, in their radially inner area, preferably have an internal contour 112 against which the hub 120 is braced with an appropriate, matching external contour 113 which preferably acts as a bearing for the second centrifugal mass 102 which is rigidly connected to the hub 120. Between the external contour 113 of the hub 120 and the internal contour 112 of the spring cups 107 and guide shoes 108 there is thus effectively a friction bearing point, or areas, which extends circumferentially over a large angular range and is formed by components which are already present.

The hub 120 is preferably rigidly connected, radially inside the channel 106, to the second centrifugal mass 102 by means of rivets 129. Between the radially inside area of the cover plate 124 and the hub 120, there is preferably a seal system 125 which includes both an axially prestressed spring plate 126 and a seal element 135. The prestress of the spring plate 126 can also preferably be used to fix the hub 120 together with the second centrifugal mass 102 in the axial direction on the first centrifugal mass 101. It could also be possible to configure this spring plate 126 in the manner of a friction ring as discussed above. For this purpose, between the hub 120 and a radial inside wall 122 of the first centrifugal mass 101, there is preferably a stop surface which is formed, for example, by the interposition of a wearing ring 123. The wearing ring 123 can thereby preferably be made of a material which has suitable friction characteristics, and together with the prestress of the spring plate 126 can be used to generate a specified friction force. It could be possible to configure this ring 123 in the manner of a friction ring as discussed above.

The axial localization in the opposite direction can thereby be provided by an end surface 128 of guide tabs 127 which are attached to the hub 120, whereby the end surface 128 is opposite the inside wall 110 of the cover plate 124. Thus there is essentially an axial localization in both directions. The guide tabs 127, which can be manufactured, for example, by axial extensions displaced from the material of the hub 120, enlarge the external contour 113 opposite the internal contour 112 of the spring cups 107 and of the guide shoes 108, so that at these locations, the friction bearing point is distributed over a larger area. When there are an even number of spring sets, the guide tabs 127 can preferably be located alternately in one axial direction and in the other axial direction.

In the first centrifugal mass 101, matching the external contour 113, there can preferably be a cylindrical, circular guide surface 114, which is located on the side of the hub 120 facing the crankshaft. On this guide surface 114, the spring cups 107 and the guide shoes 108 with their internal contour 115 can also be guided inwardly in the radial direction. The hub 120 also extends radially inward, beyond the area in which it is fastened to the second centrifugal mass 102, by means of lugs 130 which are engaged in corresponding recesses of a friction disk 131 which is in contact with a surface of the first centrifugal mass 101 under the prestress of a spring 133. Thus a friction device is formed which is used when there is a relative rotation between the two centrifugal masses 101 and 102, and, if necessary, with corresponding clearance angles.

One feature of the invention resides broadly in the torsional vibration damper in the drive train of a vehicle, consisting of a disc-shaped input part with friction linings that is arranged concentric to an axis of rotation, a disc-shaped output part, which is likewise oriented concentric to the axis of rotation and which has a hub so that it can be non-rotationally mounted on a gear shaft, springs in apertures of the input part and the output part for the transmission of torque from one part to the other against the force of the spring as the two parts rotate relative to one another, a friction ring arrangement between axially opposite surfaces of the input part and the output part with a friction ring to which an axial force is applied, which friction ring is installed concentric to the axis of rotation, characterized by the fact that the friction ring 16–19, 29, 30, is made of plastic, has integral, partial, essentially axially oriented indentations 22, 31, 32, 33, 35, 38, 39, 40 and is installed with an internal axial stress for the generation of axial force.

Another feature of the invention resides broadly in the torsional vibration damper characterized by the fact that the partial indentations are designed as radially outer and radially inner ring regions 31, 32 which are closed on the circumference and axially offset.

Yet another feature of the invention resides broadly in the torsional vibration damper characterized by the fact that the partial indentations are realized as essentially diagonal tabs 33 oriented radially outward, the circumferential end regions of which are held free by means of partial cuts 34 oriented approximately radially.

Still another feature of the invention resides broadly in the torsional vibration damper characterized by the fact that the partial indentations are realized as tabs 35 which are held free by partial radial and circumferential outs 36,37.

A further feature of the invention resides broadly in the torsional vibration damper characterized by the fact that the partial indentations are formed by a circumferential corrugated structure of the friction ring.

Another feature of the invention resides broadly in the torsional vibration damper characterized by the fact that the partial indentations are formed by a radially oriented, corrugated structure of the friction ring crest 22.

Yet another feature of the invention resides broadly in the torsional vibration damper characterized by the fact that there are three ring regions radially above one another, of which the radially outermost 38 and the radially innermost 39 are oriented in one axial direction and the middle region 40 is oriented in the other axial direction.

Still another feature of the invention resides broadly in the torsional vibration damper characterized by the fast that the friction ring 16, 30 is preferably non-rotationally connected to the output part by means of integral, axially separated projections 20, 21 arranged over the ring.

A further feature of the invention resides broadly in the torsional vibration damper whereby the hub disc with an inside toothed portion is engaged non-rotationally in an outside toothed portion of the hub with clearance in the circumferential direction, one cover plate is located on each side of the hub disc, both cover plates are rigidly connected to one another and held at a fixed distance, one of which cover plates has a friction lining, one cover plate is mounted on the hub via a guide element and this guide element represents an axial support against a contact surface on the hub, and a no-load damping system is active in the vicinity of the clearance of the toothed portion, characterized by the fact that the friction ring system 16–19, 29, 30 is located on the side of the hub disc 4 opposite the guide element 13, essentially between the toothed portion 5,6 and the other cover plate 8.

Another feature of the invention resides broadly in the torsional vibration damper characterized by the fact that there is a friction ring 29 having three ring regions 38, 39, 40 radially above one another, of which the radially outermost 38 is in contact with the hub disc 4, the radially innermost 39 is in contact with the end face of the outside toothed portion 6 and the middle region 40 is in contact with the inside of the cover plate 8.

Yet another feature of the invention resides broadly in the torsional vibration damper characterized by the fact that the cross-section of the friction ring 29 varies over its radial span.

Still another feature of the invention resides broadly in the torsional vibration damper characterized by the fact that the cross-section in the vicinity of the outside toothed portion 6 corresponding to the radially inner region 39 is preferably thinner.

A further feature of the invention resides broadly in the torsional vibration damper characterized by the fact that two radially superimposed friction rings 16, 17; 30 are arranged such that the radially inner friction ring 27 extends from a concentric guide surface of the hub 2 to the outside diameter of the outside toothed portion 6 and the radially outer ring 30 extends radially outward from approximately the outside diameter of the outside toothed portion 6.

Another feature of the invention resides broadly in the torsional vibration damper whereby, at least in the area of its inside toothed portion, the hub disc with the side facing toward the other cover plate is axially recessed with respect to the outside toothed portion of the hub, characterized by the fact that the inside diameter of the radially outer friction ring 30 is centered on the end region of the outside toothed portion 6 which is free from the inside toothed portion 5.

Yet another feature of the invention resides broadly in the torsional vibration damper characterized by the fact that the radial inner friction ring 16, on the side opposite the other cover plate 8, has at least two axially separated projections 20, 21 which are molded onto the ring, forming an integral unit, and which are engaged non-rotationally in corresponding openings in the hub 2.

Still another feature of the invention resides broadly in the torsional vibration damper whereby, at least in the vicinity of its inside toothed portion, the hub disc with the side facing toward the other cover plate is axially recessed with respect to the outside toothed portion of the hub, characterized by the fact that the projections 20, 21 are engaged in openings in the form of the axial spaces of the outside toothed portion 6 of the hub 2.

A further feature of the invention resides broadly in the torsional vibration damper characterized by the fact that the contour of the projections 20 essentially corresponds to the contour of the toothed portion 6.

Another feature of the invention resides broadly in the torsional vibration damper characterized by the fact that the projections 20 are conical in the axial direction, becoming narrower away from the friction ring 16.

Yet another feature of the invention resides broadly in the torsional vibration damper characterized by the fact that there are other axial projections 21 distributed around the circumference which have a circumferential elongation Y which is smaller than the gaps of the toothed portion 6.

Still another feature of the invention resides broadly in the torsional vibration damper characterized by the fact that manufacturing tolerances of the individual projections 21 are more liberal, at least in the circumferential direction, than those for the projections 20.

A further feature of the invention resides broadly in the torsional vibration damper characterized by the fact that, when viewed along the circumference, the friction ring 26 has alternating regions with projections 20 and 21 and regions with partial indentations in the form of wave crests 23 for the generation of an internal axial stress.

Another feature of the invention resides broadly in the torsional vibration damper characterized by the fact the radially outer friction ring 30 is engaged non-rotationally by means of axial projections 20 in regions extended radially inward of the apertures 10 for the torsion springs 12.

Yet another feature of the invention resides broadly in the torsional vibration damper characterized by the fact that at least one of the two friction rings 30 has discontinuities 41 in that area adjacent to the inside of the cover plate 8, into which discontinuities—at least in the neutral position of the clutch plate—local indentations 43 of the cover plate are engaged with clearance S in the circumferential direction.

Still another feature of the invention resides broadly in the torsional vibration damper characterized by the fact that it is located inside the clutch plate 1 of a friction clutch.

A further feature of the invention resides broadly in the torsional vibration damper characterized by the fact that it is located between the two masses which can rotate relative to one another of a dual-mass flywheel.

Examples of friction clutches and friction clutch discs which may be utilized in accordance with the embodiments of the present invention may be found in the following U.S. Patents: U.S. Pat. No. 3,861,764, which issued to Adams on Jan. 21, 1975, entitled "Bearing Assembly and Bearing Bushing Therefor"; U.S. Pat. No. 4,433,771, which issued to Caray on Feb. 28, 1984, entitled "Torsion Damping Device for a Clutch Plate"; U.S. Pat. No. 4,453,838, which issued to Loizeau on Jun. 12, 1984, entitled "Torsion Damping Assembly and Radially Deformable Bearing Therefor"; U.S. Pat. No. 4,635,780, which issued to Wiggen on Jan. 13, 1987, entitled "Clutch Disc for a Motor Vehicle Friction Clutch"; U.S. Pat. No. 4,684,007, which issued to Maucher on Aug. 4, 1987, entitled "Clutch Plate"; U.S. Pat. No. 4,697,682, which issued to Alas et al. on Oct. 6, 1987, entitled Torsional Damper Device"; U.S. Pat. No. 4,763,767, which issued to Lanzarini et al. on Aug. 16, 1988, entitled "Torsional Damper Device"; and U.S. Pat. No. 4,890,712, which issued to Maucher et al. on Jan. 2, 1990, entitled "Torsional Vibration Damping Device for Clutch Plates".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a drive train of a motor vehicle, said friction clutch comprising:

a rotary power input member;

a housing;

a clutch disc disposed within the housing, said clutch disc defining an axis of rotation and an axial direction parallel to the axis of rotation;

pressure plate means disposed within said housing and movable in the axial direction, said pressure plate means for applying an axial force to said clutch disc along the axial direction for engaging said clutch disc with said rotary power input means;

biasing means for biasing the pressure plate means in the axial direction;

said clutch disc comprising:

hub means, said hub means comprising:

a hub portion for engaging shaft means of a transmission; and a hub disc disposed about said hub portion and extending radially from said hub portion, said hub disc having a first side and a second side;

at least one cover plate disposed adjacent said hub disc, said at least one cover plate being rotationally mounted on said hub portion for relative rotational movement with respect to said hub disc;

damping means for damping relative rotational movement between said hub disc and said at least one cover plate;

friction lining means connected to said at least one cover plate for being engaged between said pressure plate means and said rotary power input means;

at least one friction ring disposed about said hub portion and axially pre-stressed between said hub means and said at least one cover plate;

said at least one friction ring comprising:

a first portion, said first portion being substantially ring-shaped and defining a plane substantially radially with respect to said axis of rotation, said first portion for contacting one of:

said hub means, and said at least one cover plate; and at least one second portion, said at least one second portion extending axially away from said first portion a substantial distance in the axial direction, and said at least one second portion for contacting the other of:

said hub means, and said at least one cover plate.

2. The friction clutch according to claim 1, wherein:

said at least one friction ring has a radially inner portion and a portion radially outward from said radially inner portion;

said radially inner portion comprising one of said first ring-shaped portion and said second portion; and said radially outward portion comprising the other of said first ring-shaped portion and said second portion.

3. The friction clutch according to claim 2, wherein:

said radially inner portion comprises said first ring-shaped portion;

said radially outward portion comprises at least one of:

a) a second ring-shaped member disposed radially outward to, and axially offset from said first ring-shaped portion, said second ring-shaped member defining a plane substantially radially to said axis of rotation, said second ring shaped member comprising said second portion of said friction ring;

b) a second ring-shaped member disposed radially outward to, and in axial alignment with said first ring-shaped portion, said second ring-shaped member comprising at least two tabs, radially disposed and bent axially away from said plane of said first ring-shaped portion, said at least two tabs comprising said second portion of said friction ring;

c) a second ring-shaped member disposed radially outward to, and in axial alignment with said first ring-shaped portion, said second ring-shaped member comprising at least two tabs, circumferentially disposed and bent axially away from said plane of said first ring-shaped portion, said at least two tabs comprising said second portion of said friction ring; and d) a second ring-shaped member disposed radially outward to said first ring-shaped portion, said second ring shaped member comprising a circumferential corrugation axially offset from said plane of said first ring-shaped portion, said corrugation comprising said second portion of said friction ring.

4. The friction clutch according to claim 3, further including:

said friction ring comprising means for non-rotationally engaging with said hub means; and said friction ring comprising means for providing an evenness of frictional forces at said contact surfaces between said friction ring and said hub means and between said friction ring and said at least one cover plate during wear of said friction ring.

5. The friction clutch according to claim 4, wherein said friction ring comprises a plastic material for providing the evenness of frictional forces at said contact surfaces between said friction ring and said hub means and between said friction ring and said at least one cover plate during wear of said friction ring.

6. The friction clutch according to claim 5, wherein:

said hub portion comprises a circumferential toothing disposed therearound, said circumferential toothing comprising a plurality of spaced apart teeth disposed radially away from said hub portion;

said hub disc comprises a plurality of radially inwardly disposed teeth for engaging between ones of said radially outwardly disposed teeth of said hub portion;

said teeth of said hub portion having an axial length substantially greater than an axial length of said teeth of said hub disc to define a circumferential and axial clearance adjacent at least a portion of said teeth of said hub;

said at least one cover plate comprises first and second cover plates, with one of said first and second cover plates being disposed adjacent each of said first and second sides of said hub disc, said first and second cover plates being non-rotationally connected to one another;

said clutch plate further comprises a guide element for mounting said first cover plate on said hub means, said guide element comprising means for both radially and axially positioning said first cover plate on said hub portion; and said at least one friction ring is disposed between said second cover plate means and said hub means.

7. The friction clutch according to claim 6, wherein:

said at least one friction ring comprises one friction ring of the type d) of claim 3;

said radially outward portion comprising an intermediate portion disposed adjacent said radially inner portion and a radially outermost portion disposed adjacent said intermediate portion opposite said radially inner portion;

said radially inner portion being disposed axially adjacent and contacting said teeth of said hub portion;

said intermediate portion being disposed axially offset from said radially inner portion and in contact with said second cover plate means; and said radially outermost portion being disposed axially away from said intermediate portion in an axial direction of said radially inner portion and in contact with said hub disc in the circumferential and axial clearance about said teeth of said hub portion.

8. The friction clutch according to claim 7, wherein:

said friction ring has a thickness in the axial direction; and said thickness increases from said radially inner portion to said radially outer portion.

9. The friction clutch according to claim 6, wherein:

said at least one friction ring comprises a first, radially outer friction ring of one of the types a), b), c) and d) of claim 3;

said clutch plate further includes a second, radially inner friction ring, said second radially inner friction ring comprising one of:

type a) of claim 3;

type b) of claim 3;

type c) of claim 3; and e) wherein said friction ring comprises a ring-shaped, planar portion defining a substantially radial plane with respect to said axis of rotation and having radial corrugations disposed about said friction ring;

said first, radially outer friction ring being disposed in said circumferential and axial clearance about said teeth of said hub portion, between and contacting said hub disc and said second cover plate; and said second, radially inner friction ring being disposed axially adjacent said teeth of said hub portion, between and contacting said teeth of said hub portion and said second cover plate.

10. The friction clutch according to claim 9, wherein:

said first, radially outer friction ring has an inside diameter, and the inside diameter of said first, radially outer friction ring is centered on the teeth of said hub portion in the circumferential and axial clearance;

said second, radially inner friction ring comprises at least one axially oriented projection;

said hub portion comprising at least one opening for receiving said at least one projection; and said at least one axially oriented projection for being engaged within said opening of said hub portion to non-rotationally connect said second friction ring with said hub portion.

11. The friction clutch according to claim 9, wherein:

said second friction ring comprises a friction ring of the type e) of claim 9;

said ring-shaped portion is disposed towards said second cover plate with said corrugations extending axially towards said teeth of said hub member;

said friction ring comprises at least two diametrically opposed corrugations;

each of said two corrugations further comprises one of said axially oriented projections;

said axially oriented projections are configured for being engaged, without play, in spaces between adjacent ones of said teeth of said hub member;

said spaces between the teeth having a contour; and said teeth having a contour substantially the same as the contour of the space between the teeth.

12. The friction clutch according to claim 11, wherein:

said axial projections on said corrugations comprise first axial projections;

said first axial projections are conical in the axial direction, becoming narrower away from said ring-shaped portion;

said second friction ring further comprises second axial projections extending axially in the same direction as said first axial projections;

said second axial projections being disposed substantially between said corrugations;

said first projections have a first circumferential length dimension;

said second projections have a second circumferential length dimension;

said second circumferential length dimension being less than said first circumferential length dimension to fit, with play, in said spaces between said teeth of said hub portion; and said first and second projections alternate about the circumference of said second friction ring.

13. The friction clutch according to claim 12, wherein:

said first friction ring comprises axial projections extending towards said hub disc;

said damping means comprise springs;

said hub disc has openings therein for receipt of said springs therein;

at least one of said openings having a circumferential clearance radially inwardly of said springs; and said axial projections of said first friction ring being non-rotationally engaged in said circumferential clearance of said spring openings.

14. The friction clutch according to claim 13, wherein:

said radially inner portion of said first friction ring comprises circumferential notches therein;

said second cover plate comprises projections extending into said notches;

said notches having a circumferential length;

said projections of said cover plate having a circumferential length;

said circumferential length of said projections being substantially less than said circumferential length of said notches by a clearance distance to provide for at least some movement of said projections within said notches during relative rotational movement between said hub disc and said second cover plate;

said second cover plate being relatively rotatable with respect to said hub disc by an amount greater than said clearance distance; and said projections of said second cover plate being movable out of said clearances to increase an axial stress on said friction ring upon relative rotation between said second cover plate and said hub disc of an amount greater than said clearance distance.

15. The friction clutch according to claim 9, wherein:

said first friction ring comprises axial projections extending towards said hub disc;

said damping means comprise springs;

said hub disc has openings therein for receipt of said springs therein;

at least one of said openings having a circumferential clearance radially inwardly of said springs; and said axial projections of said first friction ring being non-rotationally engaged in said circumferential clearance of said spring openings for movement of said first friction ring with said hub disc.

16. The friction clutch according to claim 14, wherein:

said radially inner portion of said first friction ring comprises circumferential notches therein;

said second cover plate comprises projections extending into said notches;

said notches having a circumferential length;

said projections of said cover plate having a circumferential length;

said circumferential length of said projections being substantially less than said circumferential length of said notches by a clearance distance to provide for at least some movement of said projections within said notches during relative rotational movement between said hub disc and said second cover plate;

said second cover plate being relatively rotatable with respect to said hub disc by an amount greater than said clearance distance; and said projections of said second cover plate being movable out of said clearances to increase an axial stress on said friction ring upon relative rotation between said second cover plate and said hub disc of an amount greater than said clearance distance.

17. A friction clutch for a drive train of a motor vehicle, said friction clutch comprising:

a housing;

a clutch disc disposed within the housing, said clutch disc defining an axis of rotation and an axial direction parallel to the axis of rotation;

pressure plate means disposed within said housing and movable in the axial direction, said pressure plate means for applying an axial force to said clutch disc along the axial direction for engaging said clutch disc with said rotary power input means;

spring means for biasing the pressure plate means in the axial direction;

said friction clutch further comprising a torsional damper;

said torsional damper comprising:

a rotary power input member, said rotary power input member comprising a first disc-shaped member;

a rotary power output member, said rotary power output member comprising a second disc-shaped member, said second disc shaped member comprising a hub, said hub defining an axis of rotation;

biasing means disposed between said input member and said output member to dampen relative rotational movement between said input member and said output member;

at least one friction ring disposed about said hub and axially pre-stressed between said input member and said output member;

said at least one friction ring comprising:

at least a first portion for contacting one of: said input member and said output member;

at least one second portion for contacting the other of: said input member and said output member; and means for providing an evenness of frictional force at said contacting portions during wear of said friction ring.

18. The friction clutch according to claim 17, wherein at least said first and second portions of said friction ring comprise a plastic material for contacting said input member and said output member to provide an evenness of frictional force at said contacting portions during wear of said friction ring.

19. The friction clutch according to claim 18, further including:

said first portion being substantially ring-shaped and defining a plane substantially radially with respect to said axis of rotation;

said at least one second portion extending axially away from said first portion a substantial distance in the axial direction;

said at least one friction ring has a radially inner portion and a portion radially outward to said radially inner portion;

said radially inner portion comprising one of said first ring-shaped portion and said second portion; and said radially outward portion comprising the other of said first ring-shaped portion and said second portion.

20. The friction clutch according to claim 19, wherein:

said radially inner portion comprises said first ring-shaped portion;

said radially outward portion comprises at least one of:

a) a second ring-shaped member disposed radially outward to, and axially offset from said first ring-shaped portion, said second ring-shaped member defining a plane substantially radially to said axis of rotation, said second ring shaped member comprising said second portion of said friction ring;

b) a second ring-shaped member disposed radially outward to, and in axial alignment with said first ring-shaped portion, said second ring-shaped member comprising at least two tabs, radially disposed and bent axially away from said plane of said first ring-shaped portion, said at least two tabs comprising said second portion of said friction ring;

c) a second ring-shaped member disposed radially outward to, and in axial alignment with said first ring-shaped portion, said second ring-shaped member comprising at least two tabs, circumferentially disposed and bent axially away from said plane of said first ring-shaped portion, said at least two tabs comprising said second portion of said friction ring; and d) a second ring-shaped member disposed radially outward to said first ring-shaped portion, said second ring shaped member comprising a circumferential corrugation axially offset from said plane of said first ring-shaped portion, said corrugation comprising said second portion of said friction ring;

said friction ring comprising means for non-rotationally engaging with said hub means;

said friction ring comprises axial projections extending towards said output member;

said damping means comprise springs;

said output member and said input member comprise substantially aligned openings therein for receipt of said springs therein to dampen relative rotational movement between said input member and said output member;

at least one of said openings of said output member having a circumferential clearance radially inwardly of said springs;

said axial projections of said friction ring being non-rotationally engaged in said circumferential clearance of said spring openings of said output member for movement along with said output member;

said radially inner portion of said friction ring comprises circumferential notches therein;

said input member comprises projections extending into said notches;

said notches having a circumferential length;

said projections of said input member having a circumferential length;

said circumferential length of said projections being substantially less than said circumferential length of said notches by a clearance distance to provide for at least some movement of said projections within said notches during relative rotational movement between said input member and said output member;

said output member being relatively rotatable with respect to said input member by an amount greater than said clearance distance; and said projections of said output member being movable out of said clearances to increase an axial stress on said friction ring upon relative rotation between said input member and said output member of an amount greater than said clearance distance; and the drive train comprises a friction clutch and a two-mass flywheel and said torsional damper comprises a torsional damper of one of: the friction clutch and the two-mass flywheel.

* * * * *

UNITED STATES PATENT AND TRADEMARK OFFICE
CERTIFICATE OF CORRECTION

PATENT NO. : 5,529,161
DATED : June 25, 1996
INVENTOR(S) : Norbert AMENT and Harald RAAB It is certified that error appears in the above-indentified patent and that said Letters Patent is hereby corrected as shown below:

In column 9, line 26, after '22',', delete "end" and insert --and--.

In column 15, line 7, after 'circumferential', delete "outs" and insert --cuts--.

Signed and Sealed this

Seventh Day of January, 1997

Attest:

BRUCE LEHMAN

*Attesting Officer*     *Commissioner of Patents and Trademarks*